United States Patent
Chen et al.

(10) Patent No.: US 11,783,716 B2
(45) Date of Patent: Oct. 10, 2023

(54) RETURN FLIGHT CONTROL METHOD AND DEVICE FOR UNMANNED AERIAL VEHICLE, AND UNMANNED AERIAL VEHICLE

(71) Applicant: SZ DJI TECHNOLOGY CO., LTD., Shenzhen (CN)

(72) Inventors: Chaobin Chen, Shenzhen (CN); Kai Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 473 days.

(21) Appl. No.: 17/033,451

(22) Filed: Sep. 25, 2020

(65) Prior Publication Data
US 2021/0020057 A1     Jan. 21, 2021

Related U.S. Application Data

(63) Continuation of application No. PCT/CN2018/094007, filed on Jul. 2, 2018.

(51) Int. Cl.
| | |
|---|---|
| G08G 5/02 | (2006.01) |
| B64C 39/02 | (2023.01) |
| G05D 1/06 | (2006.01) |
| G08G 5/00 | (2006.01) |
| G01S 19/42 | (2010.01) |

(52) U.S. Cl.
CPC .......... *G08G 5/025* (2013.01); *B64C 39/024* (2013.01); *G05D 1/0676* (2013.01); *G08G 5/0069* (2013.01); *G08G 5/0086* (2013.01); *B64U 2201/20* (2023.01)

(58) Field of Classification Search
CPC ...... G08G 5/025; G08G 5/0056; G01S 19/42; B64C 39/024; G05D 1/0676
See application file for complete search history.

(56) References Cited

U.S. PATENT DOCUMENTS

| | | | |
|---|---|---|---|
| 10,074,284 B1 | 9/2018 | Priest | |
| 2014/0142787 A1* | 5/2014 | Tillotson | H04K 3/224 |
| | | | 701/3 |

(Continued)

FOREIGN PATENT DOCUMENTS

| | | |
|---|---|---|
| CN | 104679013 A | 6/2015 |
| CN | 104797995 A | 7/2015 |

(Continued)

OTHER PUBLICATIONS

The World Intellectual Property Organization (WIPO) International Search Report for PCT/CN2018/094007 dated Mar. 25, 2019 8 pages.

*Primary Examiner* — Tan Q Nguyen
(74) *Attorney, Agent, or Firm* — ANOVA LAW GROUP, PLLC

(57) ABSTRACT

A return flight control method includes obtaining return-flight-evaluation information in a return flight mode, controlling an unmanned aerial vehicle (UAV) to return to an alternate landing area in response to that the return-flight-evaluation information satisfies a preset requirement, and controlling the UAV to return to a return point in response to that the return-flight-evaluation information does not satisfy the preset requirement.

20 Claims, 5 Drawing Sheets

(56) References Cited

U.S. PATENT DOCUMENTS

| | | | | |
|---|---|---|---|---|
| 2017/0233097 A1* | 8/2017 | Chang | ............... | G08G 5/0021 |
| | | | | 701/3 |
| 2018/0061247 A1* | 3/2018 | Brown | ............... | G08G 5/0069 |
| 2019/0009904 A1* | 1/2019 | Winkle | ............... | B64C 39/024 |
| 2019/0014461 A1* | 1/2019 | Winkle | ............... | G08B 21/02 |

FOREIGN PATENT DOCUMENTS

| | | | |
|---|---|---|---|
| CN | 105093130 A | 11/2015 | |
| CN | 105116917 A | 12/2015 | |
| CN | 105182994 A | 12/2015 | |
| CN | 105607645 A | 5/2016 | |
| CN | 105807787 A | 7/2016 | |
| CN | 105911573 A | 8/2016 | |
| CN | 106094841 A | 11/2016 | |
| CN | 106227232 A | 12/2016 | |
| CN | 106527481 A | 3/2017 | |
| CN | 107636549 A | 1/2018 | |
| CN | 108116686 A | 6/2018 | |
| WO | 2017083406 A1 | 5/2017 | |

* cited by examiner

RETURN FLIGHT CONTROL METHOD AND DEVICE FOR UNMANNED AERIAL VEHICLE, AND UNMANNED AERIAL VEHICLE

CROSS-REFERENCE TO RELATED APPLICATION

This application is a continuation of International Application No. PCT/CN2018/094007, filed on Jul. 2, 2018, the entire content of which is incorporated herein by reference.

TECHNICAL FIELD

The present disclosure relates to the field of unmanned aerial vehicle (UAV) and, more particularly, to a return flight control method and device for a UAV, and the UAV.

BACKGROUND

Currently, when an unmanned aerial vehicle (UAV) is flying and a preset return flight condition is satisfied, the UAV enters a return flight mode and returns to a preset return point. However, the UAV in the return flight mode is not able to safely return to the return point due to limitations of, for example, a battery power, a navigation accuracy, a flight control accuracy, or the like.

SUMMARY

In accordance with the disclosure, there is provided a return flight control method including obtaining return-flight-evaluation information in a return flight mode, controlling an unmanned aerial vehicle (UAV) to return to an alternate landing area in response to that the return-flight-evaluation information satisfies a preset requirement, and controlling the UAV to return to a return point in response to that the return-flight-evaluation information does not satisfy the preset requirement.

Also in accordance with the disclosure, there is provided a return flight control device including a memory storing executable instructions and a processor configured to execute the executable instructions stored in the memory to obtain return-flight-evaluation information in a return flight mode, control an unmanned aerial vehicle (UAV) to return to an alternate landing area in response to that the return-flight-evaluation information satisfies a preset requirement, and control the UAV to return to a return point in response to that the return-flight-evaluation information does not satisfy the preset requirement.

BRIEF DESCRIPTION OF THE DRAWINGS

The drawings are intended to provide a clearer illustration of the present disclosure. The drawings used in the description of the disclosed embodiments are briefly described below. It will be appreciated that the disclosed drawings are merely examples, but not intended to limit the present disclosure.

DETAILED DESCRIPTION OF THE EMBODIMENTS

Figure 1:
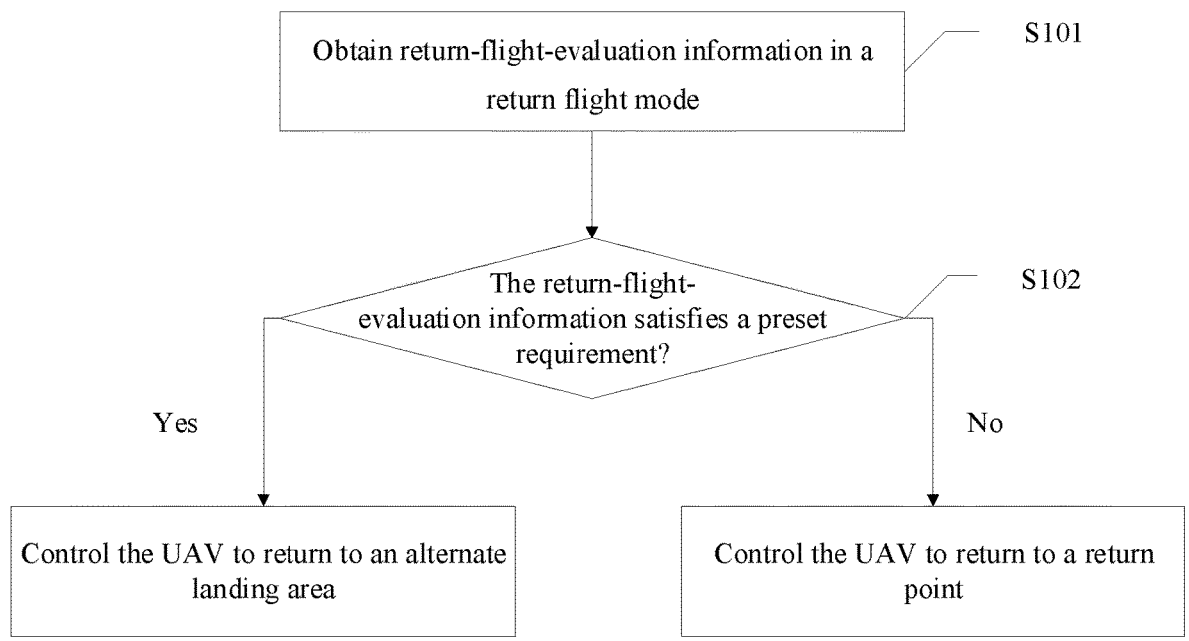
FIG. 1 is a schematic flow chart of a return flight control method for an unmanned aerial vehicle (UAV) consistent with embodiments of the disclosure.

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. Further, when a first component "obtains" data from a second component, the first component can directly communicate with the second component to obtain the data, or can obtain the data from the second component via another component.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Exemplary embodiments will be described with reference to the accompanying drawings. Unless conflicting, the exemplary embodiments and features in the exemplary embodiments can be combined with each other.

During a flight of an unmanned aerial vehicle (UAV), due to environmental factors (e.g., an electromagnetic interference, an obstruction by obstacles, and/or the like) or a large distance between the UAV to a control terminal, the UAV may be disconnected from the control terminal. In this situation, the UAV can enter a return flight mode and return to a preset return point. In some embodiments, when the UAV detects that a remaining power is insufficient or receives a return-flight-instruction sent by a user through the control terminal, the UAV can enter the return flight mode and return to the preset return point.

However, the UAV in the return flight mode may not be able to safely return to the return point due to restrictions of, for example, a battery power, a navigation accuracy, a flight control accuracy, or the like. For example, the UAV may take off in a place with poor geographical conditions. Taking the UAV taking off on a ridge or beach as an example, the UAV can record the ridge or beach as the return point. When the UAV is in the return flight mode, the navigation accuracy of the current UAV may be poor, for example, real-time kinematic (RTK) data received by a RTK device arranged at the UAV may be invalid and the RTK device cannot complete a positioning of the return point, or a GPS positioning receiver may receive satellite signals from less than 4 satellites, or the flight control accuracy may be poor, for example, the UAV navigated in an environment with a high wind speed cannot achieve a high-precision flight control. Therefore, the UAV may land in a paddy field next to the ridge or water next to the beach due to a landing deviation. As another example, when the UAV is in the return flight mode, if the distance between the UAV and the return point is large, and the current remaining power of the UAV is not enough to support the UAV to fly to the return point, the UAV may fall during the return flight.

To solve the problems described above, the present disclosure provides a return flight control method and device for the UAV to improve a flexibility and reliability of the UAV return flight, and ensure a flight safety of the UAV.

FIG. 1 is a schematic flow chart of an example return flight control method for the UAV consistent with the disclosure. The method can be executed by, e.g., a return flight control device or one or more processors of the return flight control device. The return flight control device may be arranged at the UAV. In some embodiments, the return flight control device may be arranged at a control terminal. Each of the one or more processors may be a general-purpose or special-purpose processor. The one or more processors may operate individually or collectively.

As shown in FIG. 1, at S101, return-flight-evaluation information is obtained in the return flight mode. During the flight of the UAV, when a preset return-flight-condition is determined to be satisfied, for example, the return-flight-instruction (actively triggered by a user) sent by the control terminal is received, the current power is determined to be lower than a preset return-flight-power threshold, or a communication connection with the control terminal is disconnected, the return flight control device can control the UAV to enter the return flight mode. When the UAV is in the return flight mode, the return flight control device can obtain the return-flight-evaluation information. The return-flight-evaluation information may include any information instructing the UAV to select the return flight mode. For example, the return-flight-evaluation information may include any information instructing the UAV to select the return point and an alternate landing area.

At S102, when the return-flight-evaluation information satisfies a preset requirement, the UAV is controlled to return to the alternate landing area, otherwise, the UAV is controlled to return to the return point. For example, after obtaining the return-flight-evaluation information, the return flight control device can detect whether the return-flight-evaluation information satisfies the preset requirement. The return flight mode can be selected according to whether the return-flight-evaluation information satisfies the preset requirement.

Figure 2:
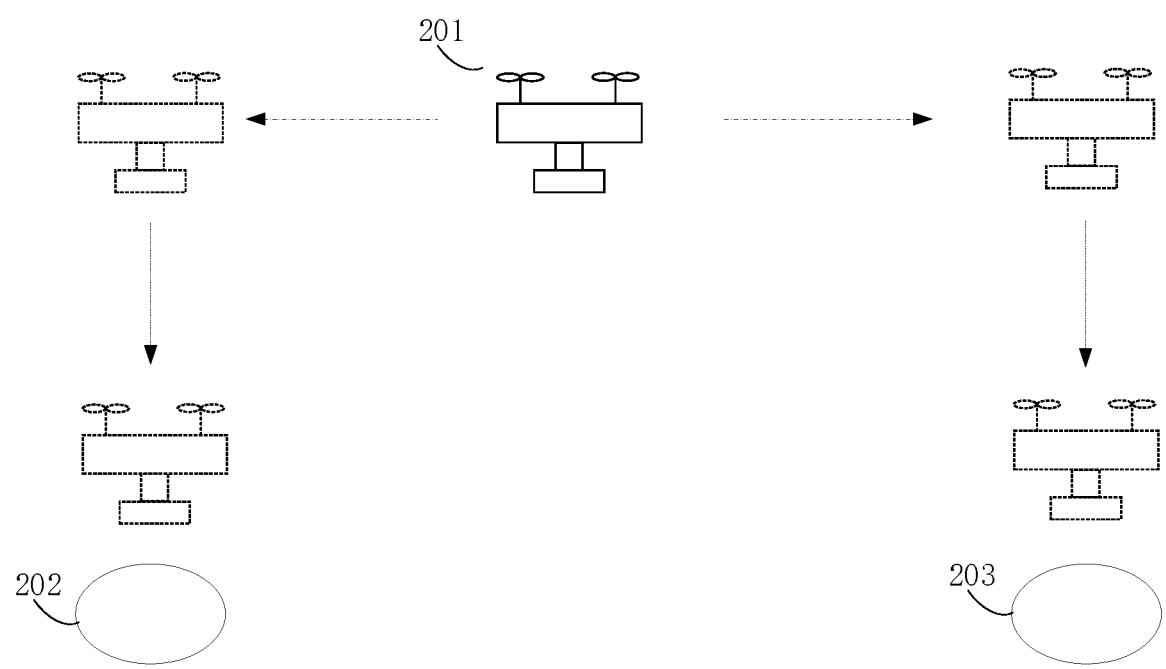
FIG. 2 schematically shows a return flight control device for a UAV selecting a return flight mode according to return-flight-evaluation information consistent with embodiments of the disclosure.

FIG. 2 schematically shows an example return flight control device for a UAV 201 selecting the return flight mode according to the return-flight-evaluation information consistent with the disclosure. As shown in FIG. 2, when the return-flight-evaluation information satisfies the preset requirement, the return flight control device may control the UAV 201 to return to an alternate landing area 202, otherwise, the return flight control device can control the UAV 201 to return to a return point 203.

Consistent with the disclosure, the UAV in the return flight mode can determine whether to return to the return point or the alternate landing area based on the return-flight-evaluation information. As such, the UAV can flexibly select a destination of the return flight to ensure the flight safety of the UAV and improve the flexibility and reliability of the return flight of the UAV.

In some embodiments, the alternate landing area can satisfy one or more of the following requirements.

1. A minimum distance from a center point of the alternate landing area to a boundary of the alternate landing area cannot be less than a positioning error of a low-precision positioning device arranged at the UAV. For example, the UAV can include a high-precision positioning device, such as the RTK device, and the UAV can also include the low-precision positioning device, such as the GPS receiver. If the positioning error of the low-precision positioning device is 5 meters, the minimum distance between the center point and the boundary of the alternate landing area cannot be less than 5 meters.

2. A distance from the alternate landing area to the return point cannot exceed a preset distance threshold, such as a maximum flight range of the UAV.

3. An environment of the alternate landing area needs to satisfy an operating condition of the low-precision positioning device arranged at the UAV. For example, the alternate landing area needs to be sufficiently open and unobstructed for the GPS receiver.

4. A requirement for the navigation accuracy at the alternate landing area is lower than a requirement for the navigation accuracy at the return point.

5. A requirement for the flight control accuracy at the alternate landing area is lower than a requirement for the flight control accuracy at the return point.

6. An altitude of the alternate landing area cannot be higher than a cruise altitude set for the return flight of the UAV.

In some embodiments, the method can further include receiving alternate-landing-area-indication information sent by the control terminal. The alternate-landing-area-indication information refers to any information indicating the alternate landing area. The alternate-landing-area-indication information can be determined by the control terminal according to a setting operation of the alternate landing area. Controlling the UAV to return to the alternate landing area can include controlling the UAV to return to the alternate landing area indicated by the alternate-landing-area-indication information. For example, the user can set the alternate landing area via the control terminal, and perform the setting operation of the alternate landing area via the control terminal. After detecting the setting operation, the control terminal may determine the alternate-landing-area-indication information. The alternate-landing-area-indication information can be sent to the return flight control device, and the return flight control device may control the UAV to return to the alternate landing area indicated by the alternate-landing-area-indication information.

Figure 3:
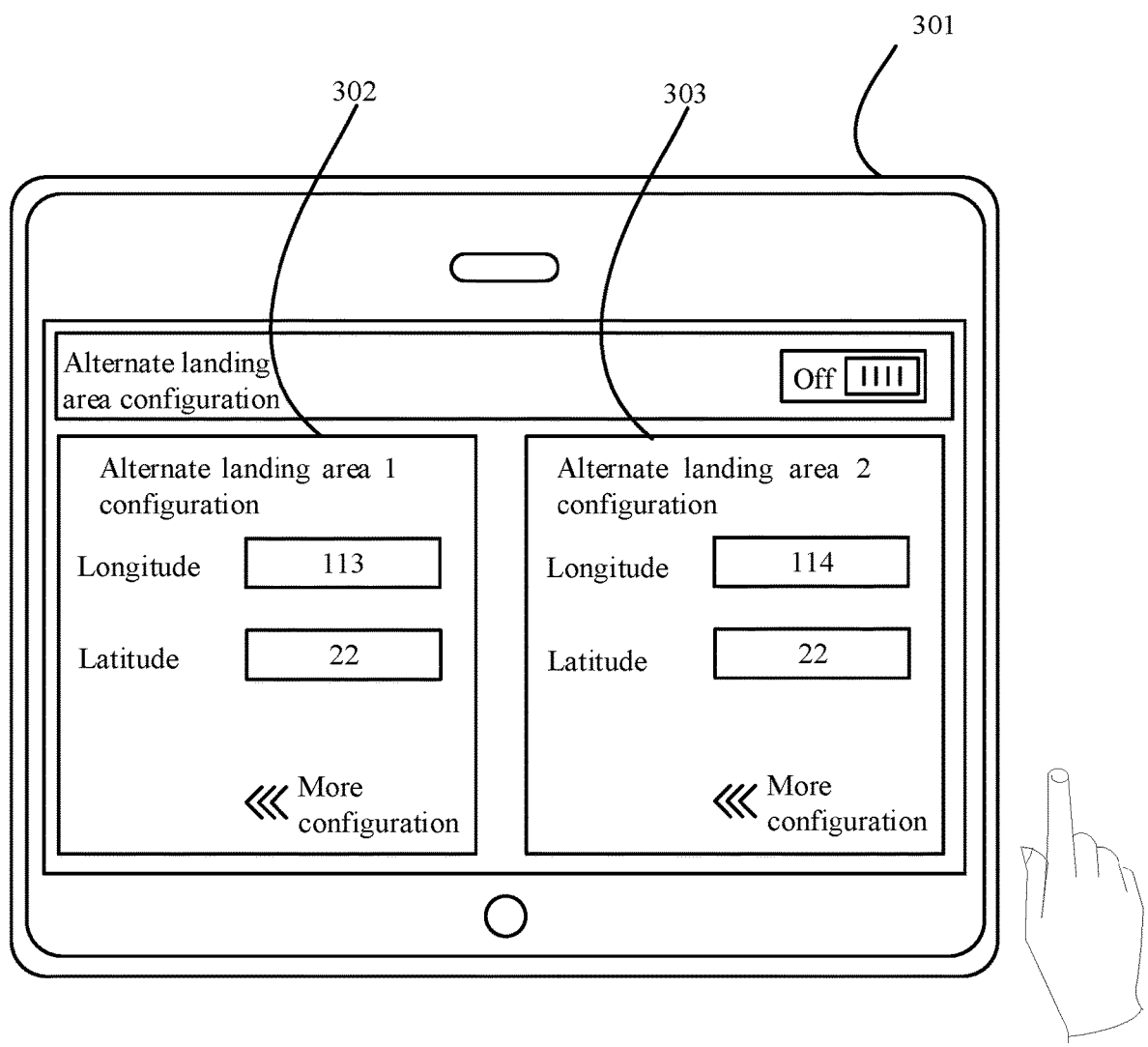
FIG. 3 schematically shows a setting operation of an alternate landing area by a user consistent with embodiments of the disclosure.

In some embodiments, the alternate-landing-area-indication information may include position information of the alternate landing area. FIG. 3 schematically shows the setting operation of the alternate landing area performed by the user consistent with the disclosure. As shown in FIG. 3, the user can set the position information of the alternate landing area on an interactive interface displayed on the control terminal 301. After the setting operation is completed, the position information of the alternate landing area set by the user can be sent to the return flight control device, and the return flight control device can control the UAV according to the position information of the alternate landing area.

In some embodiments, the UAV can include a photographing device, and the alternate-landing-area-indication information can include the position information of the alternate landing area in an image shot by the photographing device. The control terminal may display the image shot by the photographing device of the UAV, and the user may select an area in the image as the alternate landing area. The setting operation of the alternate landing area may include a user's click or frame selection operation on the image. The control terminal may send the position information of the alternate landing area selected by the user in the image to the UAV. The return flight control device may determine the position information of the alternate landing area according to the position information of the alternate landing area in the image, and control the UAV to return to the alternate landing area according to the position information.

In some embodiments, the alternate-landing-area-indication information may include an image of the alternate landing area. The image may be shot by the photographing device of the UAV.

In some embodiments, the method can further include receiving return-point-indication information sent by the control terminal. The return-point-indication information refers to any information indicating the return point. The return-point-indication information can be determined by the control terminal according to a detected setting operation of the return point. Controlling the UAV to return to the return point can include controlling the UAV to return to the return point indicated by the return-point-indication information. In some embodiments, the return-point-indication information may include position information of the return point. In some embodiments, the return-point-indication information can include the position information of the return point on the image shot by the photographing device. The principles and explanations herein are similar to the principles and explanations of the alternate-landing-area-indication information described above, and detailed description thereof is omitted herein.

In some embodiments, the method can further include obtaining environmental data output by an environmental sensor arranged at the UAV, determining terrain information according to the environmental data, and selecting the alternate landing area according to the terrain information. The environmental sensor for obtaining the environmental data can be arranged at the UAV. The environmental sensor can include, for example, a vision sensor (e.g., an RGB camera, a monocular camera, a dual-head camera, or the like), a radar, a time of flight (TOF) camera, or the like, and the environmental data can include one or more of a grayscale image, an RGB image, a depth image, and a point cloud. The return flight control device may obtain the environmental data and determine the terrain information of the environment where the UAV is located according to the environmental data. By analyzing the terrain information, the return flight control device can determine one or more alternate landing areas from the ground of the surrounding environment according to the terrain information.

In some embodiments, determining the terrain information according to the environmental data can include determining a digital map according to the environmental data, and determining the terrain information according to the digital map. For example, after the return flight control device obtaining the environmental data, the digital map of the surrounding environment can be constructed based on the environmental data. The constructed digital map can include the terrain information of the surrounding environment. That is, the terrain information of the surrounding environment can be determined according to the constructed digital map.

In some embodiments, selecting the alternate landing area according to the terrain information can include selecting the alternate landing area that satisfies the preset requirement according to the terrain information. For example, after determining the terrain information of the surrounding environment, the return flight control device can select the alternate landing area that satisfies the preset requirement from the ground of the surrounding environment. For example, a flat ground closest to a current position of the UAV can be selected as the alternate landing area, or a piece of ground having a largest flat area and within a preset distance from the UAV can be selected as the alternate landing area. When the flat area is large, the requirements for the flight control accuracy and the navigation accuracy can be lower.

In some embodiments, obtaining the return-flight-evaluation information can include obtaining a control command sent by the control terminal, and when the return-flight-evaluation information satisfies the preset requirement, controlling the UAV to return to the alternate landing area. Controlling the UAV to return to the return point can include controlling the UAV to return to the alternate landing area when the control command includes an alternate-landing-area-indication command, otherwise, controlling the UAV to return to the return point. The alternate-landing-area-indication command refers to a command instructing the UAV to return to the alternate landing area.

For example, when the UAV is in the return flight mode, the user can select an option of the return flight mode for the UAV through the control terminal, and the control terminal can detect a selection operation indicated the option of the return flight mode by the user to determine the control command. The option of the return flight mode can include at least one of returning to the return point and returning to the alternate landing area. The control command can be sent to the return flight control device, and the return flight control device can receive the control command sent by the user through the control terminal. The control command may include the alternate-landing-area-indication command and a return-point-indication command. The alternate-landing-area-indication command may include a command instructing the UAV to return to the alternate landing area. In some embodiments, the alternate-landing-area-indication command can include identification information of the alternate landing area. In some embodiments, the alternate-landing-area-indication command can include the position information of the alternate landing area, and the return-point-indication command may include a command instructing the UAV to return to the return point. In some embodiments, the return-point-indication command can include identification information of the return point. In some embodiments, the return-point-indication command can include position information of the return point.

When the control command includes the alternate-landing-area-indication command, the return flight control device can control the UAV to return to the alternate landing area. The return flight control device can control the UAV to return to the alternate landing area according to the set position information and cruise altitude of the alternate landing area. When the control command includes the return-point-indication command, the return flight control device can control the UAV to return to the return point. The return flight control device can control the UAV to return to the return point according to the set position information and cruise altitude of the return point.

In some embodiments, obtaining the return-flight-evaluation information can include obtaining the remaining power of the UAV. When the return-flight-evaluation information satisfies the preset requirement, the UAV is controlled to return to the alternate landing area. Controlling the UAV to return to the return point can include when the remaining power is less than or equal to a preset power threshold, controlling the UAV to return to the alternate landing area, otherwise, controlling the UAV to return to the return point.

For example, the return-flight-evaluation information can include the remaining power of the UAV. The return flight control device may compare the remaining power of the UAV with the preset power threshold, and determine the option of the return flight mode of the UAV based on a comparison result. When the remaining power is less than or equal to the preset power threshold, the UAV can be controlled to return to the alternate landing area, otherwise, the UAV can be controlled to return to the return point.

In some embodiments, the preset power threshold can be determined according to the power required by the UAV to fly from the current position to the return point. The return flight control device can determine the power required by the UAV to fly from the current position to the return point in real time, and set the preset power threshold based on the power required by the UAV to fly from the current position to the return point. For example, the preset power threshold can be equal to the power required by the UAV to fly from the current position to the return point, or the preset power threshold can be set equal to 1.1 times or 1.2 times of the power required by the UAV to fly from the current position to the return point. When the return flight control device determines that the remaining power of the UAV is less than or equal to the preset power threshold, the remaining power of the UAV may not be sufficient for the UAV to successfully return to the return point. Therefore, it is no longer possible to try to return to the return point and the UAV can be directly controlled to return to the alternate landing area. When the return flight control device determines that the remaining power of the UAV is greater than the preset power threshold, the return flight control device can control the UAV to return to the return point.

In some embodiments, the preset power threshold can be determined according to the power required by the UAV to fly from the current position to the alternate landing area. The return flight control device can determine the power required by the UAV to fly from the current position to the alternate landing area in real time, and set the preset power threshold based on the power required by the UAV to fly from the current position to the alternate landing area. For example, the preset power threshold can be equal to the power required by the UAV to fly from the current position to the alternate landing area, or the preset power threshold can be set equal to 1.2 times or 1.3 times of the power required by the UAV to fly from the current position to the alternate landing area. When the return flight control device determines that the remaining power of the UAV is less than or equal to the preset power threshold, it means that the current remaining power of the UAV is only enough to safely return to the alternate landing area. If the UAV continues to be controlled to return to the return point, the remaining power of the UAV may not be sufficient to support the UAV to successfully return to the alternate landing area. Therefore, when the return flight control device determines that the remaining power of the UAV is less than or equal to the preset power threshold, the UAV can be controlled to return to the alternate landing area. When the return flight control device determines that the remaining power of the UAV is greater than the preset power threshold, the return flight control device can control the UAV to return to the return point.

In some embodiments, controlling the UAV to return to the return point can include controlling the UAV to fly to above the return point according to a preset flight height control strategy, and controlling the UAV to land to the return point if the current navigation accuracy is greater than a preset navigation accuracy threshold, otherwise, controlling the UAV to hover or return to the alternate landing area.

Figure 4:
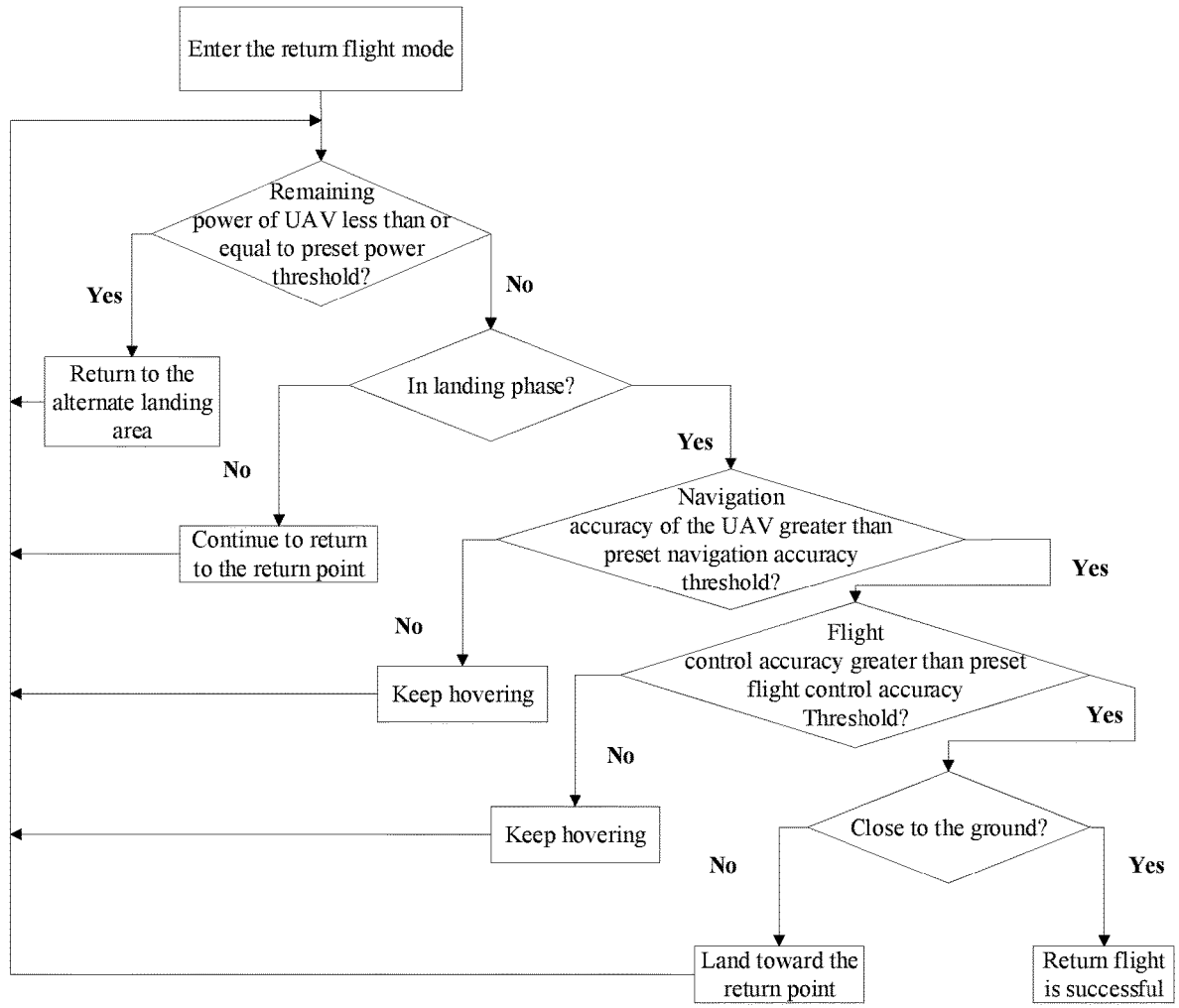
FIG. 4 is a schematic flow chart of another return flight control method for a UAV consistent with embodiments of the disclosure.

FIG. 4 is a schematic flow chart of another example return flight control method for the UAV consistent with the disclosure. As shown in FIG. 4, when the UAV is in the return flight mode, the return flight control device can determine whether the current remaining power of the UAV is less than or equal to the preset power threshold. The preset power threshold can be determined according to the power required by the UAV to fly from the current position to the alternate landing area. When the remaining power is greater than the preset power threshold, the UAV can be controlled to return to the return point, otherwise, the UAV can be controlled to return to the alternate landing area. The return flight of the UAV can include a cruise phase and a landing phase. During the cruise phase of the return flight of the UAV to the return point, the return flight control device can control the UAV to fly to the return flight point according to the preset flight height control strategy. The flight height control strategy may be to control the UAV to climb to a preset altitude and fly at the preset altitude. When the UAV flies to above the return point, the return flight of the UAV can enter the landing phase. The return flight control device can detect the current navigation accuracy of the UAV and determine whether the current navigation accuracy of the UAV is greater than the preset navigation accuracy threshold. For example, whether the RTK data received by the RTK device of the UAV is valid can be determined. When the RTK data is valid, it indicates that the RTK device can accurately navigate. That is, it is determined that the current navigation accuracy is greater than the preset navigation accuracy threshold. When the RTK data is invalid, it indicates that the RTK device cannot accurately navigate. That is, it is determined that the current navigation accuracy is less than the preset navigation accuracy threshold. If the current navigation accuracy is greater than the preset navigation accuracy threshold, even if the geographic environment of the return point is poor, the UAV can still land safely towards the return point because the navigation accuracy is high enough. Therefore, if the current navigation accuracy is greater than the preset navigation accuracy threshold, the UAV can be controlled to land towards the return point. If the current navigation accuracy is less than or equal to the preset navigation accuracy threshold, in some embodiments, the return flight control device can control the UAV to hover, and in some other embodiments, the return flight control device can control the UAV to return to the alternate landing area.

In some embodiments, during the hovering process, if it is determined that the current navigation accuracy is greater than the preset navigation accuracy threshold, the UAV can be controlled to land towards the return point. If it is determined that the current remaining power is less than or equal to the preset power threshold, the UAV can be controlled to return to the alternate landing area. As shown in FIG. 4, during the hovering of the UAV, the return flight control device may continue to determine whether the current navigation accuracy is greater than the preset navigation accuracy threshold. If it is determined that the current navigation accuracy is greater than the preset navigation accuracy threshold, the return flight control device can control the UAV to land towards the return point. If it is determined that the current navigation accuracy is less than or equal to the preset navigation accuracy threshold, the return flight control device can control the UAV to continue hovering. During the hovering of the UAV, the power of the UAV will continue to be consumed, and the return flight control device can determine the current remaining power of the UAV in real time to determine whether the current remaining power is less than or equal to the preset power threshold. When the return flight control device determines that the remaining power of the UAV is less than or equal to the preset power threshold, it means that the current remaining power of the UAV is only enough to safely return to the alternate landing area. If the UAV continues to be controlled to return to the return point, the remaining power of the UAV may not be sufficient to support the UAV to successfully return to the alternate landing area. Therefore, the UAV can be controlled to return to the alternate landing area. When the return flight control device determines that the remaining power of the UAV is greater than the preset power threshold, the return flight control device can control the UAV to continue hovering.

In some embodiments, if it is determined that the current navigation accuracy is greater than the preset navigation accuracy threshold, controlling the UAV to land towards the return point can include: if it is determined that the current navigation accuracy is greater than the preset navigation accuracy threshold and the current flight control accuracy is greater than the preset flight control accuracy threshold, controlling the UAV to land towards the return point. For example, if it is determined that the current navigation accuracy is greater than the preset navigation accuracy threshold, the return flight control device can further obtain the current flight control accuracy of the UAV. When it is determined that the flight control accuracy is greater than the preset flight control accuracy threshold, it indicates that the UAV can achieve the precise navigation and can accurately control flight actions. Therefore, the return flight control device can control the UAV to land towards the return point. When it is determined that the flight control accuracy is less than or equal to the preset flight control accuracy threshold, the return flight control device may control the UAV to hover or control the UAV to return to the alternate landing area. It can be appreciated that during the process of controlling the UAV to hover, the return flight control device can perform the operations described above until the UAV lands at the return point and the return flight is successful.

In some embodiments, controlling the UAV to land towards the return point can include controlling the UAV to fly to above the return point according to the flight height control strategy, and controlling the UAV to land towards the return point, if the current flight control accuracy is greater than the preset flight control accuracy threshold, otherwise, controlling the UAV to hover or to return to the alternate landing area.

For example, the return flight of the UAV can include the cruise phase and the landing phase. During the cruise phase of the return flight of the UAV to the return point, the return flight control device can control the UAV to fly to the return flight point according to the preset flight height control strategy. The flight height control strategy may be to control the UAV to climb to a preset altitude and fly at the preset altitude. When the UAV flies to above the return point, the return flight of the UAV can detect the current flight control accuracy of the UAV and determine whether the current flight control accuracy of the UAV is greater than the preset flight control accuracy threshold. If the current flight control accuracy is greater than the preset flight control accuracy threshold, it indicates that the UAV can accurately control the flight actions. Even if the geographic environment of the return point is poor, the UAV can still land safely towards the return point. Therefore, if the current flight control accuracy is greater than the preset flight control accuracy threshold, the UAV can be controlled to land towards the return point. If the current flight control accuracy is less than or equal to the preset flight control accuracy threshold, in some embodiments, the return flight control device can control the UAV to hover, and in some other embodiments, the return flight control device can control the UAV to return to the alternate landing area.

In some embodiments, obtaining the return-flight-evaluation information may include obtaining the navigation accuracy of the UAV. When the return-flight-evaluation information satisfies the preset requirement, controlling the UAV to return to the alternate landing area, otherwise, controlling the UAV to return to the return point can include, when the navigation accuracy is less than or equal to the preset navigation accuracy threshold, controlling the UAV to return to the alternate landing area, and when the navigation accuracy is greater than the preset navigation accuracy threshold, controlling the UAV to return to the return point. In some embodiments, the requirement on the navigation accuracy for returning to the alternate landing area can be lower than the requirement on the navigation accuracy for returning to the return point. When the UAV is in the return flight mode, the return flight control device can obtain the current navigation accuracy of the UAV. If it is determined that the current navigation accuracy is less than or equal to the preset navigation accuracy threshold, the UAV can be controlled to return to the alternate landing area. If it is determined that the current navigation accuracy is greater than the preset navigation accuracy threshold, the UAV can be controlled to return to the return point.

In some embodiments, obtaining the return-flight-evaluation information may include obtaining the flight control accuracy of the UAV. When the return-flight-evaluation information satisfies the preset requirement, controlling the UAV to return to the alternate landing area, otherwise, controlling the UAV to return to the return point can include, when the flight control accuracy is less than or equal to the preset flight control accuracy threshold, controlling the UAV to return to the alternate landing area, and when the flight control accuracy is greater than the preset flight control accuracy threshold, controlling the UAV to return to the return point.

In some embodiments, the requirement on the flight control accuracy for returning to the alternate landing area can be lower than the requirement on the flight control accuracy for returning to the return point. When the UAV is in the return flight mode, the return flight control device can obtain the current flight control accuracy of the UAV. If it is determined that the current flight control accuracy is less than or equal to the preset flight control accuracy threshold, the UAV can be controlled to return to the alternate landing area. If it is determined that the current navigation accuracy is greater than the preset flight control accuracy threshold, the UAV can be controlled to return to the return point.

In some embodiments, a plurality of alternate landing areas can be set. Controlling the UAV to return to the alternate landing area can include determining a target alternate landing area from the plurality of alternate landing areas according to a preset rule, and controlling the UAV to return to the target alternate landing area. For example, the user can set the plurality of alternate landing areas via the control terminal. In the return flight mode, the return flight control device can determine the target alternate landing area from the plurality of alternate landing areas according to the preset rule, and control the UAV to return to the target alternate landing area.

In some embodiments, alternate-landing-area-selection information sent by the control terminal can be received. The alternate-landing-area-selection information can be determined by the control terminal according to a detected selection operation of the alternate landing area. Determining the target alternate landing area from the plurality of alternate landing areas according to the preset rule can include, determining the alternate landing area indicated by the alternate-landing-area-selection information from the plurality of alternate landing areas as the target alternate landing area. For example, the user can select which alternate landing area to return to via the control terminal. The user can perform the selection operation of the alternate landing area on the control terminal. The control terminal can determine the alternate-landing-area-selection information after detecting the selection operation of the alternate landing area and send the alternate-landing-area-selection information to the return flight control device. The return flight control device can select the alternate landing area indicated by the alternate-landing-area-selection information from the plurality of alternate landing areas as the target alternate landing area. The alternate-landing-area-selection information may include identification information of the alternate landing area.

In some embodiments, determining the target alternate landing area from the plurality of alternate landing areas according to the preset rule can includes, determining an alternate landing area closest to the UAV from the plurality of alternate landing areas as the target alternate landing area. For example, in the return flight mode, the return flight control device may separately determine a distance between each of the plurality of alternate landing areas and the UAV, and determine the closest alternate landing area as the target alternate landing area.

In some embodiments, determining the target alternate landing area from the plurality of alternate landing areas according to the preset rule can includes, determining, from the plurality of alternate landing areas, an alternate landing area that requires minimum navigation accuracy and flight control accuracy. For example, in the return flight mode, the return flight control device can separately determine the requirement for navigation accuracy or flight control accuracy in each of the plurality of alternate landing areas, and determine the alternate landing area with the lowest requirement for navigation accuracy and flight control accuracy as the target alternate landing area.

Figure 5:
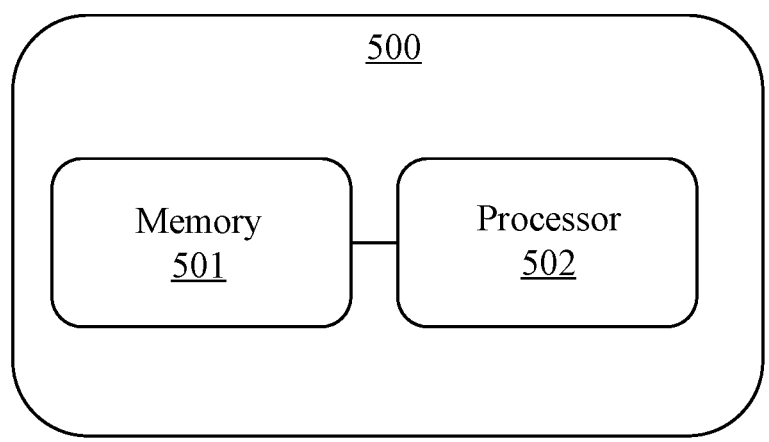
FIG. 5 is a schematic structural diagram of a return flight control device for the UAV consistent with embodiments of the disclosure.

The present disclosure further provides a return flight control device for the UAV. FIG. 5 is a schematic structural diagram of an example return flight control device 500 for the UAV consistent with the disclosure. The return flight control device 500 for the UAV may include a power circuit, various interface circuits, and the like. As shown in FIG. 5, The return flight control device 500 for the UAV further includes a memory 501 and a processor 502.

The memory 501 may include a volatile memory, for example, a random-access memory (RAM), a non-volatile memory, for example, a flash memory, a hard disk drive (HDD), or a solid-state drive (SSD), or any combination thereof. The processor 502 may include a central processing unit (CPU). The processor 502 may further include a hardware chip. In some embodiments, the return flight control device 500 may include one or more processors 502. The hardware chip may include an application specific integrated circuit (ASIC), a programmable logic device (PLD), or a combination thereof. The PLD may include a complex programmable logic device (CPLD), a field-programmable gate array (FPGA), a general array logic (GAL), or any combination thereof.

In some embodiments, the memory 501 can be configured to store program instructions. The processor 502 may call the program instructions to implement the methods in connection with FIG. 1. For example, the memory 501 can be configured to store executable instructions. The processor 502 can be configured to execute the executable instructions stored in the memory 501 to obtain the return-flight-evaluation information in the return flight mode, and when the return-flight-evaluation information satisfies the preset requirement, control the UAV to return to the alternate landing area, otherwise, control the UAV to return to the return point.

In some embodiments, the processor 502 can be further configured to receive the return-point-indication information sent by the control terminal. The return-point-indication information can be determined by the control terminal according to the detected setting operation of the return point. When controlling the UAV to return to the return point, the processor 502 can control the UAV to return to the return point indicated by the return-point-indication information.

In some embodiments, when obtaining the return-flight-evaluation information, the processor 502 can obtain the control command sent by the control terminal. When controlling the UAV to return to the alternate landing area in response to that the return-flight-evaluation information satisfies the preset requirement, otherwise, controlling the UAV to return to the return point, the processor 502 can control the UAV to return to the alternate landing area when the control command includes the alternate-landing-area-indication command, otherwise, control the UAV to return to the return point.

In some embodiments, when obtaining the return-flight-evaluation information, the processor 502 can obtain the remaining power of the UAV. When controlling the UAV to return to the alternate landing area in response to that the return-flight-evaluation information satisfies the preset requirement, otherwise, controlling the UAV to return to the return point, the processor 502 can, when the remaining power is less than or equal to the preset power threshold, control the UAV to return to the alternate landing area, otherwise, control the UAV to return to the return point. In some embodiments, the preset power threshold can be determined according to the power required by the UAV to fly from the current position to the return point. In some embodiments, the preset power threshold can be determined according to the power required by the UAV to fly from the current position to the alternate landing area.

In some embodiments, when controlling the UAV to return to the return point, the processor 502 can control the UAV to fly to above the return point according to the preset flight height control strategy, and control the UAV to return to the return point if the current navigation accuracy is greater than the preset navigation accuracy threshold, otherwise, control the UAV to hover or return to the alternate landing area.

In some embodiments, the processor 502 can be further configured, during the hovering process, if it is determined that the current navigation accuracy is greater than the preset navigation accuracy threshold, to control the UAV to land towards the return point, and if it is determined that the current remaining power is less than or equal to the preset power threshold, to control the UAV to return to the alternate landing area.

In some embodiments, when controlling the UAV to return to the return point, the processor 502 can control the UAV to fly to above the return point according to the flight height control strategy, and control the UAV to land towards the return point, if the current flight control accuracy is greater than the preset flight control accuracy threshold, otherwise, control the UAV to hover or to return to the alternate landing area.

In some embodiments, the processor 502 can be further configured, during the hovering process, if it is determined that the flight control accuracy is greater than the preset flight control threshold, to control the UAV to land towards the return point, and if it is determined that the current remaining power is less than or equal to the preset power threshold, to control the UAV to return to the alternate landing area.

In some embodiments, when obtaining the return-flight-evaluation information, the processor 502 can obtain the navigation accuracy of the UAV. When controlling the UAV to return to the alternate landing area in response to that the return-flight-evaluation information satisfies the preset requirement, otherwise, controlling the UAV to return to the return point, the processor 502 can, when the navigation accuracy is less than or equal to the preset navigation accuracy threshold, control the UAV to return to the alternate landing area, and when the navigation accuracy is greater than the preset navigation accuracy threshold, control the UAV to return to the return point.

In some embodiments, when obtaining the return-flight-evaluation information, the processor 502 can obtain the flight control accuracy of the UAV. When controlling the UAV to return to the alternate landing area in response to that the return-flight-evaluation information satisfies the preset requirement, otherwise, controlling the UAV to return to the return point, the processor 502 can, when the flight control accuracy is less than or equal to the preset flight control accuracy threshold, control the UAV to return to the alternate landing area, and when the flight control accuracy is greater than the preset flight control accuracy threshold, control the UAV to return to the return point.

In some embodiments, when obtaining the return-flight-evaluation information in the return flight mode, the processor 502 can control the UAV to return to the return point in the return flight mode, and obtain the return-flight-evaluation information during the return flight of the UAV to the return point.

In some embodiments, the plurality of alternate landing areas can be set. When controlling the UAV to return to the alternate landing area, the processor 502 can determine the target alternate landing area from the plurality of alternate landing areas according to the preset rule, and control the UAV to return to the target alternate landing area. In some embodiments, when determining the target alternate landing area from the plurality of alternate landing areas according to the preset rule, the processor 502 can determine an alternate landing area closest to the UAV from the plurality of alternate landing areas as the target alternate landing area.

In some embodiments, the processor 502 can be further configured to receive the alternate-landing-area-selection information sent by the control terminal. When determining the target alternate landing area from the plurality of alternate landing areas according to the preset rule, the processor 502 can determine the alternate landing area indicated by the alternate-landing-area-selection information from the plurality of alternate landing areas as the target alternate landing area.

In some embodiments, the processor 502 can be further configured to receive the alternate-landing-area-indication information sent by the control terminal. The alternate-landing-area-indication information can be determined by the control terminal according to the setting operation of the alternate landing area. When controlling the UAV to return to the alternate landing area, the processor 502 can control the UAV to return to the alternate landing area indicated by the alternate-landing-area-indication information. In some embodiments, the alternate-landing-area-indication information may include the position information of the alternate landing area. In some embodiments, the UAV can include the photographing device, and the alternate-landing-area-indication information can include the position information of the alternate landing area in the image shot by the photographing device.

In some embodiments, the processor 502 can be further configured to obtain the environmental data output by the environmental sensor arranged at the UAV, determine the terrain information according to the environmental data, and select the alternate landing area according to the terrain information. In some embodiments, when determining the terrain information according to the environmental data, the processor 502 can determine the digital map according to the environmental data, and determine the terrain information according to the digital map. In some embodiments, when selecting the alternate landing area according to the terrain information, the processor 502 can select the alternate landing area that satisfies the preset requirement according to the terrain information.

The return flight control device can implement the return flight control methods in connection with FIG. 1. The principle and explanation are similar to those of the methods, and detailed description thereof is omitted herein.

The present disclosure also provides a computer-readable storage medium storing executable instructions that, when being executed by one or more processors, may cause one or more processors to perform the return flight control methods consistent with the disclosure, such as the example methods described above in connection with FIG. 1.

The present disclosure also provide a UAV including the return flight control device described above.

It is intended that the embodiments disclosed herein are merely for illustrating and not to limit the scope of the disclosure. Although the embodiments are described separately above, this does not mean that the embodiments cannot be combined. The scope of the invention can be defined by the following claims or equivalent thereof. Changes, modifications, alterations, and variations of the above-described embodiments may be made by those skilled in the art without departing from the scope of the disclosure.

What is claimed is:

1. A return flight control method comprising:
   obtaining return-flight-evaluation information in a return flight mode;
   controlling an unmanned aerial vehicle (UAV) to return to an alternate landing area in response to that the return-flight-evaluation information satisfies a preset requirement; and controlling the UAV to return to a return point in response to that the return-flight-evaluation information does not satisfy the preset requirement, controlling the UAV to return to the return point including:
controlling the UAV to fly to above the return point; and
after the UAV flies to above the return point, controlling, based on a determination whether a preset condition is satisfied, the UAV to perform one of:
landing towards the return point;
hovering; and
returning to the alternate landing area.

2. The method of claim 1, further comprising:
receiving return-point-indication information sent by a control terminal, the return-point-indication information being determined by the control terminal according to a detected return point setting operation;
wherein controlling the UAV to return to the return point includes controlling the UAV to return to the return point indicated by the return-point-indication information.

3. The method of claim 1, wherein:
obtaining the return-flight-evaluation information includes obtaining a control command sent by a control terminal;
controlling the UAV to return to the alternate landing area includes controlling the UAV to return to the alternate landing area in response to that the control command includes an alternate-landing-area-indication command; and
controlling the UAV to return to the return point further includes controlling the UAV to return to the return point in response to that the control command does not include the alternate-landing-area-indication command.

4. The method of claim 1, wherein:
obtaining the return-flight-evaluation information includes obtaining a remaining power of the UAV;
controlling the UAV to return to the alternate landing area includes controlling the UAV to return to the alternate landing area in response to that the remaining power is less than or equal to a preset power threshold; and
controlling the UAV to return to the return point further includes controlling the UAV to return to the return point in response to that the remaining power is greater than the preset power threshold.

5. The method of claim 4, wherein the preset power threshold is determined according to a power needed by the UAV to fly from a current position to the return point.

6. The method of claim 4, wherein the preset power threshold is determined according to a power needed by the UAV to fly from a current position to the alternate landing area.

7. The method of claim 6, wherein:
the preset condition includes a current navigation accuracy being greater than a preset navigation accuracy threshold; and
controlling the UAV to return to the return point further includes:
controlling the UAV to fly to above the return point according to a preset flight height control strategy; and
after the UAV flies to above the return point:
controlling the UAV to land towards the return point in response to that the current navigation accuracy is greater than the preset navigation accuracy threshold; and
controlling the UAV to hover or to return to the alternate landing area in response to that the current navigation accuracy is less than or equal to the preset navigation accuracy threshold.

8. The method of claim 7, further comprising, while the UAV is hovering above the return point:
controlling the UAV to land towards the return point in response to that the current navigation accuracy is greater than the preset navigation accuracy threshold; and
controlling the UAV to return to the alternate landing area in response to that the remaining power is less than or equal to the preset power threshold.

9. The method of claim 6, wherein:
the preset condition includes a current flight control accuracy being greater than a preset flight control accuracy threshold; and
controlling the UAV to return to the return point further includes:
controlling the UAV to fly to above the return point according to a preset flight height control strategy; and
after the UAV flies to above the return point:
controlling the UAV to land towards the return point in response to that the current flight control accuracy is greater than the preset flight control accuracy threshold; and
controlling the UAV to hover or return to the alternate landing area in response to that the current flight control accuracy is less than or equal to the preset flight control accuracy threshold.

10. The method of claim 9, further comprising, while the UAV is hovering above the return point:
controlling the UAV to land towards the return point in response to that the current flight control accuracy is greater than the preset flight control accuracy threshold; and
controlling the UAV to return to the alternate landing area in response to that the remaining power is less than or equal to the preset power threshold.

11. The method of claim 1, wherein:
obtaining the return-flight-evaluation information includes obtaining a navigation accuracy of the UAV;
controlling the UAV to return to the alternate landing area includes controlling the UAV to return to the alternate landing area in response to that the navigation accuracy is less than or equal to a preset navigation accuracy threshold; and
controlling the UAV to return to the return point further includes controlling the UAV to return to the return point in response to that the navigation accuracy is greater than the preset navigation accuracy threshold.

12. The method of claim 1, wherein:
obtaining the return-flight-evaluation information includes obtaining a flight control accuracy of the UAV;
controlling the UAV to return to the alternate landing area includes controlling the UAV to return to the alternate landing area in response to that the flight control accuracy is less than or equal to a preset flight control accuracy threshold; and
controlling the UAV to return to the return point further includes controlling the UAV to return to the return point in response to that the flight control accuracy is greater than the preset flight control accuracy threshold.

13. The method of claim 1, wherein obtaining the return-flight-evaluation information includes:
   controlling the UAV to return to the return point in the return flight mode; and
   obtaining the return-flight-evaluation information during a return flight of the UAV to the return point.

14. The method of claim 1, wherein:
   the alternate landing area is one of a plurality of alternate landing areas; and
   controlling the UAV to return to the alternate landing area includes:
      determining a target alternate landing area from the plurality of alternate landing areas according to a preset rule; and
      controlling the UAV to return to the target alternate landing area.

15. The method of claim 14, wherein determining the target alternate landing area from the plurality of alternate landing areas includes determining one of the plurality of alternate landing areas that is closest to the UAV as the target alternate landing area.

16. The method of claim 14, further comprising:
   receiving alternate-landing-area-selection information sent by a control terminal;
   wherein determining the target alternate landing area from the plurality of alternate landing areas includes determining one of the plurality of alternate landing areas that is indicated by the alternate-landing-area-selection information as the target alternate landing area.

17. The method of claim 1, further comprising:
   receiving alternate-landing-area-indication information sent by a control terminal, the alternate-landing-area-indication information being determined by the control terminal according to an alternate landing area setting operation;
   wherein controlling the UAV to return to the alternate landing area includes controlling the UAV to return to the alternate landing area indicated by the alternate-landing-area-indication information.

18. The method of claim 1, further comprising:
   obtaining environmental data output by an environmental sensor arranged at the UAV;
   determining terrain information according to the environmental data; and
   selecting the alternate landing area according to the terrain information.

19. A return flight control device comprising:
a memory storing executable instructions; and
a processor configured to execute the executable instructions stored in the memory to:
   obtain return-flight-evaluation information in a return flight mode;
   control an unmanned aerial vehicle (UAV) to return to an alternate landing area in response to that the return-flight-evaluation information satisfies a preset requirement; and
   control the UAV to return to a return point in response to that the return-flight-evaluation information does not satisfy the preset requirement, controlling the UAV to return to the return point including:
      controlling the UAV to fly to above the return point; and
      after the UAV flies to above the return point, controlling, based on a determination whether a preset condition is satisfied, the UAV to perform one of:
         landing towards the return point;
         hovering; and
         returning to the alternate landing area.

20. A return flight control method comprising:
obtaining return-flight-evaluation information in a return flight mode;
controlling an unmanned aerial vehicle (UAV) to return to an alternate landing area in response to that the return-flight-evaluation information satisfies a preset requirement; and
controlling the UAV to return to a return point in response to that the return-flight-evaluation information does not satisfy the preset requirement, controlling the UAV to return to the return point including:
   controlling the UAV to fly to above the return point; and
   after the UAV flies to above the return point:
      controlling the UAV to land towards the return point in response to that a current flight control accuracy is greater than a preset flight control accuracy threshold; and
      controlling the UAV to hover or return to the alternate landing area in response to that the current flight control accuracy is less than or equal to the preset flight control accuracy threshold.

\* \* \* \* \*